(12) United States Patent
Ohya

(10) Patent No.: US 6,220,666 B1
(45) Date of Patent: Apr. 24, 2001

(54) SEAT RECLINING DEVICE

(75) Inventor: Masakiyo Ohya, Shizuoka (JP)

(73) Assignee: Fuji Kiko Co., Ltd., Tokyo (JP)

( * ) Notice: Subject to any disclaimer, the term of this patent is extended or adjusted under 35 U.S.C. 154(b) by 0 days.

(21) Appl. No.: 09/288,863

(22) Filed: Apr. 9, 1999

(30) Foreign Application Priority Data

Apr. 21, 1998 (JP) ................................................ 10-110266

(51) Int. Cl.⁷ ........................................................... B60N 2/20
(52) U.S. Cl. ................................................................ 297/367
(58) Field of Search .............................................. 297/367

(56) References Cited

U.S. PATENT DOCUMENTS

| | | | |
|---|---|---|---|
| 4,770,464 | * | 9/1988 | Pipon et al. ........................... 297/367 |
| 5,558,402 | * | 9/1996 | Yamada ............................. 297/367 X |
| 5,622,407 | * | 4/1997 | Yamada et al. .................... 297/367 X |
| 5,622,408 | * | 4/1997 | Yamada et al. ........................ 297/367 |
| 5,681,086 | * | 10/1997 | Baloche ................................ 297/367 |
| 5,749,624 | * | 5/1998 | Yoshida ................................ 297/367 |
| 5,762,400 | * | 6/1998 | Okazaki et al. ...................... 297/367 |
| 5,779,313 | * | 7/1998 | Rohee ................................... 297/367 |
| 5,816,656 | * | 10/1998 | Hoshihara et al. ................... 297/367 |
| 5,873,630 | * | 2/1999 | Yoshida et al. ....................... 297/367 |
| 6,023,994 | * | 2/2000 | Yoshida ............................. 297/367 X |
| 6,024,410 | * | 2/2000 | Yoshida ............................. 297/367 X |

* cited by examiner

*Primary Examiner*—Peter M. Cuomo
*Assistant Examiner*—Rodney B. White
(74) *Attorney, Agent, or Firm*—Foley & Lardner

(57) ABSTRACT

A seat reclining device is provided, which has a base plate secured to a seat cushion; a tooth plate secured to a seatback; a center shaft for permitting the tooth plate to pivot relative to the base plate; first teeth possessed by the tooth plate; a tooth piece having second teeth which are engageable with the first teeth to establish a locked condition between the base plate and the tooth plate, the tooth piece having parallel side walls; and a guide groove defined by the base plate for slidably receiving therein the tooth piece, the guide groove having parallel guide walls which face and contact the parallel side walls of the tooth piece respectively. The parallel side walls are provided near the first teeth with respective projections which are directed toward each other. Due to provision of the projections, the locked engagement between the tooth piece and the tooth plate through the first and second teeth is assuredly kept without producing play even when a marked shock is applied therebetween.

14 Claims, 5 Drawing Sheets

SEAT RECLINING DEVICE

BACKGROUND OF THE INVENTION

1. Field of the Invention

The present invention relates to seat reclining devices and more particularly to automotive seat reclining devices of a type which employs toothed elements for locking a seatback at a desired angular position relative to a seat cushion.

2. Description of the Prior Art

Hitherto, various types of seat reclining devices have been proposed and put into practical use particularly in the field of motor vehicles. Some are of a type which employs toothed elements for obtaining a reliable locked condition of the seatback at a desired angular position relative to a seat cushion. That is, in such type seat reclining devices, two toothed elements are employed, which are brought into a meshed engagement when it is needed to lock the seatback at the desired angular position. When it becomes to need to change the angular position of the seatback, the locked engagement between the two toothed elements is cancelled to permit a free pivotal movement of the seatback to a new desired angular position.

However, due to their inherent construction, some of the conventional seat reclining devices have failed to provide users with a satisfied operation. That is, when applied with a certain load upon supporting the back of the seat occupant, some of the seatbacks tend to make an unexpected slight back pivoting, which makes the seat occupant uncomfortable. Usually, such undesired back pivoting is caused by a play of one of the two mutually engaged toothed elements relative to the other, which is produced when the load is applied therebetween.

SUMMARY OF THE INVENTION

It is therefore an object of the present invention to provide a seat reclining device of a type using toothed elements, which is free of the above-mentioned undesired slight back pivoting of the seatback.

It is another object of the present invention to provide a seat reclining device of a type using toothed elements, which is simple, compact and economical.

According to a first aspect of the present invention, there is provided a seat reclining device which comprises a base plate adapted to be secured to a seat cushion; a tooth plate adapted to be secured to a seatback; a center shaft for permitting the tooth plate to pivot relative to the base plate; first teeth possessed by the tooth plate; a tooth piece having second teeth which are engageable with the first teeth to bring about a locked condition between the base plate and the tooth plate, the tooth piece having parallel side walls; and a guide groove defined by the base plate for slidably receiving therein the tooth piece, the guide groove having parallel guide walls which face and contact the parallel side walls of the tooth piece respectively, wherein at least one of the parallel guide walls is provided with a projection which is projected in a direction to reduce a width of the guide groove.

According to a second aspect of the present invention, there is provided a seat reclining device which comprises a base plate adapted to be secured to a seat cushion; a tooth plate adapted to be secured to a seatback; a center shaft for permitting the tooth plate to pivot relative to the base plate; first teeth possessed by the tooth plate; a tooth piece having second teeth which are engageable with the first teeth to establish a locked condition between the base plate and the tooth plate, the tooth piece having parallel side walls; a guide groove defined by the base plate for slidably receiving therein the tooth piece, the guide groove having parallel guide walls which face and contact the parallel side walls of the tooth piece respectively; a cam member pivotally supported by the center shaft, the cam member moving the tooth piece in a direction to establish the engagement between the first and second teeth when pivoted in a first direction and moving the tooth piece in a direction to cancel the engagement between the first and second teeth when pivoted in a second direction; and a control lever pivotally supported by the center shaft and rotated together with the cam member, wherein the parallel guide walls are provided near said first teeth with respective projections which are directed toward each other.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, first and second embodiments 100 and 200 of the present invention will be described in detail with reference to the accompanying drawings. Since the first and second embodiments are similar in construction to each other, description on one embodiment will be made with the aid of the other embodiment.

For ease of understanding, some drawings carry thereon directional indications such as "front", "rear", "right" and "left" which are to be understood with respect to a passenger seated on a seat to which the seat reclining device of the present invention is practically applied.

Figure 1:
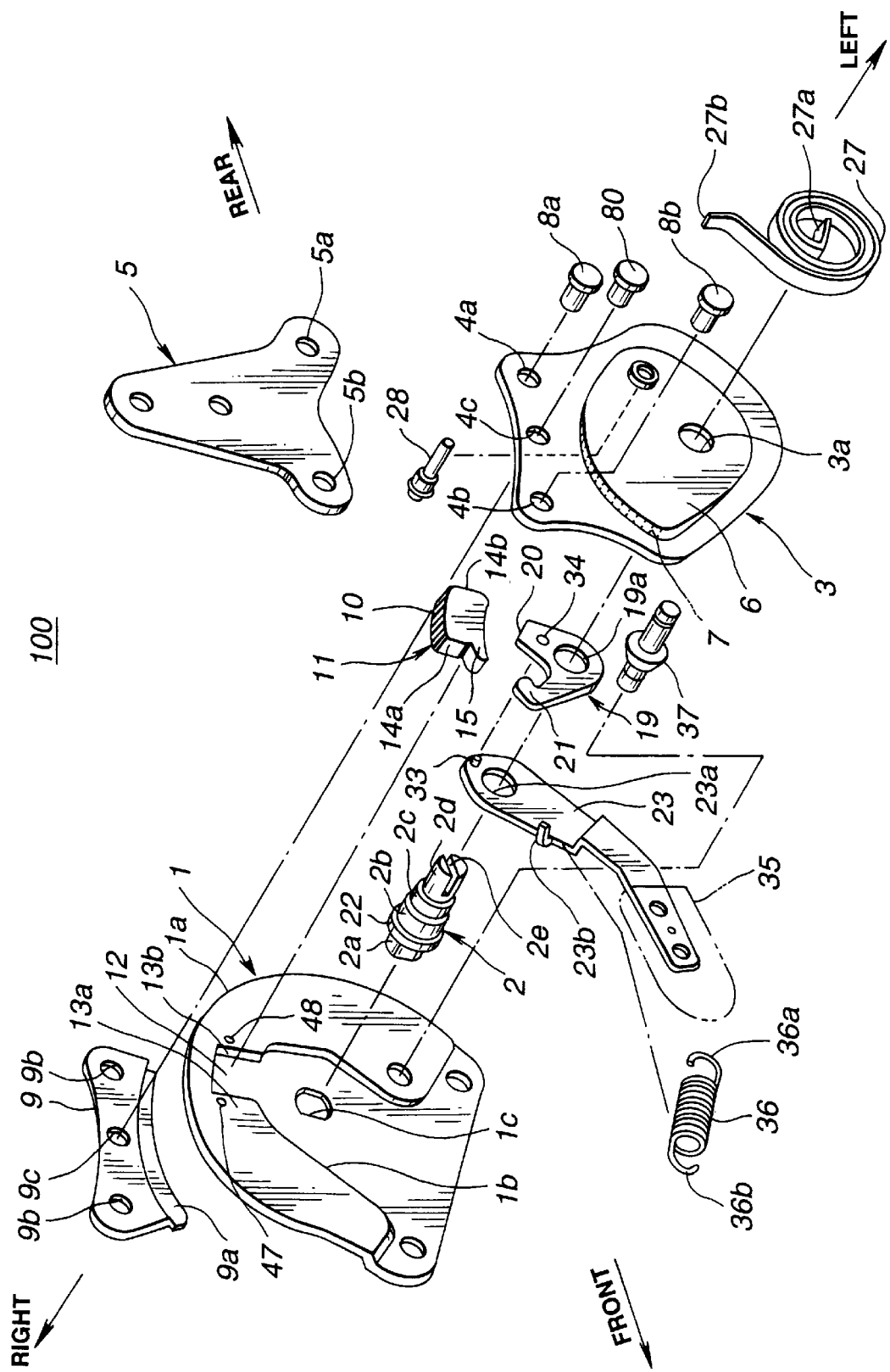
FIG. 1 is an exploded view of a seat reclining device which is a first embodiment of the present invention.

Referring to FIG. 1, there is shown in an exploded manner a seat reclining device 100 which is a first embodiment of the present invention.

Figure 2:
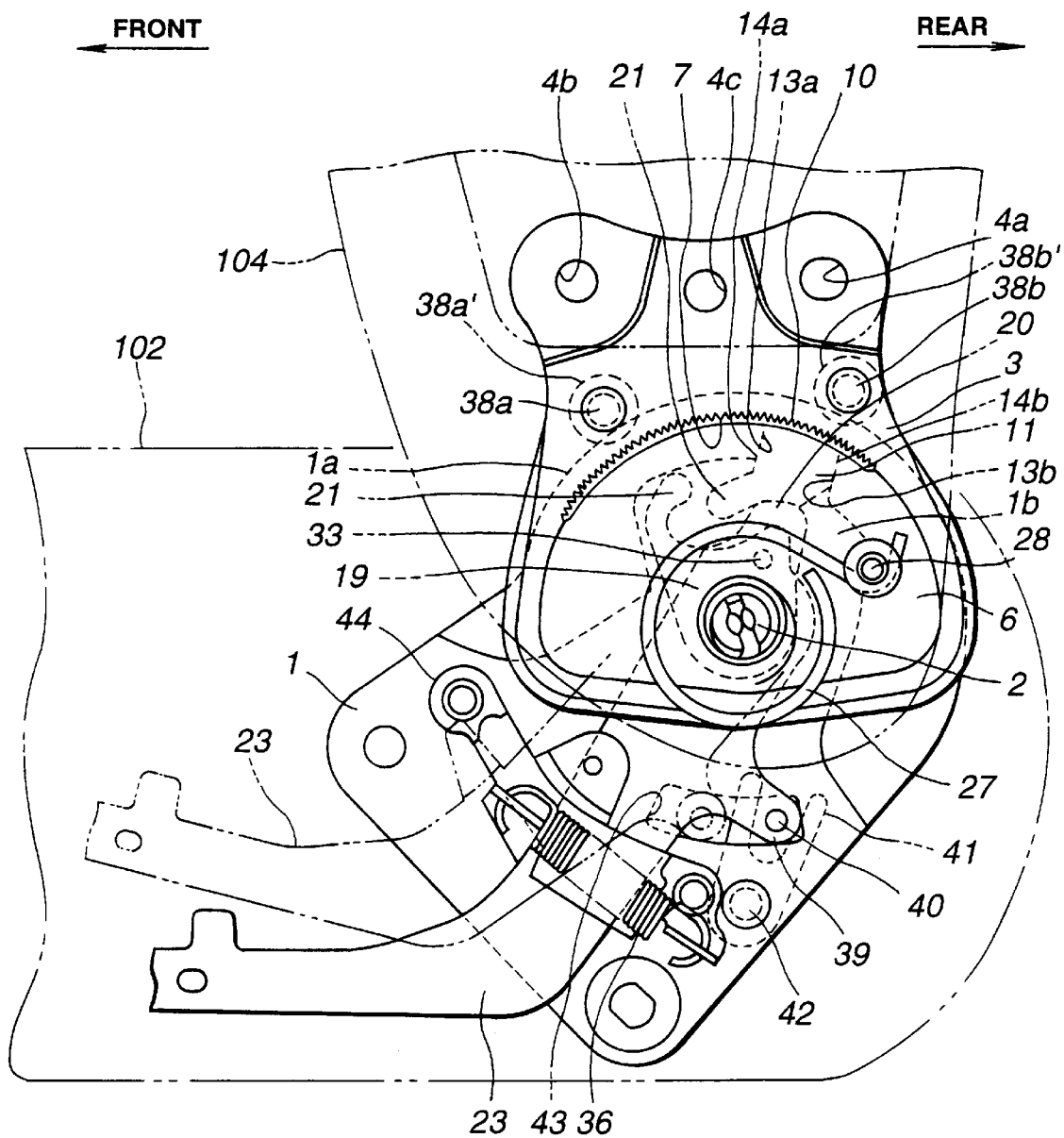
FIG. 2 is a front view of a seat reclining device which is a second embodiment of the present invention.

In the drawing, denoted by numeral 1 is a base plate which is secured to a rear left side of a seat cushion (102, see FIG. 2). A tooth plate 3 is pivotally connected to the base plate 1 through a center shaft 2.

To the tooth plate 3, there is secured an arm member 5 through pins 8a and 8b. For this connection, the arm member 5 and the tooth plate 3 are formed with two pairs of aligned openings (5a, 4a) and (5b, 4b) through which the pins 8a and 8b pass respectively. As will be described in detail hereinafter, each pin 8a or 8b is caulked.

The arm member 5 is secured to a lower left side of a seatback (104, see FIG. 2). Thus, the base plate 1, the center shaft 2, the tooth plate 3 and the arm 5 constitute a left-side pivot mechanism by which the seatback 104 is pivotal relative to the seat cushion 102. Although not shown in the drawing, a right-side pivot mechanism similar to the above-mentioned left-side one is installed at a rear right side of the seat cushion 102. That is, the seatback 104 is pivotally connected to the seat cushion 102 through the left-side and right-side pivot mechanisms.

The base plate 1 is formed with a round upper edge 1a which is concentric with an axis of the center shaft 2. The tooth plate 3 is formed, on a surface facing the base plate 1, with a generally sectoral recess 6. An upper arcuate wall of the recess 6 is shaped concentric with the axis of the center shaft 2 and formed with teeth 7 (viz., first teeth). These teeth 7 may be provided by a press working or the like.

For assuring the pivotal connection between the tooth plate 3 and the base plate 1, a sliding holder 9 is employed which is connected to an upper portion of the tooth plate 3. For this connection, the above-mentioned two pins 8a and 8b and another pin 80, the above-mentioned two openings 4a and 4b of the tooth plate 3 and another opening 4c of the same, and three openings 9b, 9b and 9c formed in the sliding holder 9 are employed. That is, each pin 8a, 8b or 80 passing through the aligned openings of the tooth plate 3 and the sliding shoe 9 is caulked for the connection between the tooth plate 3, the arm member 5 and the sliding holder 9. That is, the these three parts 3, 5 and 9 can pivot about the axis of the center shaft 2 like a single unit.

The sliding holder 9 has an arcuate track 9a which is slidably mated with the round upper edge 1a of the base plate 1, so that upon pivoting of the tooth plate 3 relative to the base plate 1, the track 9a of the sliding holder 9 slides on and along the round upper edge 1a of the base plate 1 while preventing separation of the tooth plate 3 from the base plate 1. That is, due to provision of the sliding holder 9, a stable and smoothed pivoting of the tooth plate 3 relative to the base plate 1 is achieved.

A tooth piece 11 is partially and movably received in the sectoral recess 6 of the tooth plate 3. That is, the thickness of the tooth piece 11 is somewhat greater than the depth of the sectoral recess 6. The tooth piece 11 is formed at its upper round edge with teeth 10 (second teeth) which are operatively engageable with the teeth 7 of the tooth plate 3. The tooth piece 11 has two parallel side walls 14a and 14b and a lateral projection 15.

The base plate 1 is formed with a recess 1b in which the projected part of the tooth piece 11 is slidably received. A radially extending guide groove 12 for the tooth piece 11 is provided by the base plate 1, which is merged with the recess 1b and has two parallel guide walls 13a and 13b. That is, for the guided movement of the tooth piece 11 by the guide groove 12, the parallel side walls 14a and 14b of the tooth piece 11 slidably contact the parallel guide walls 13a and 13b of the guide groove 12 respectively.

Denoted by numerals 47 and 48 are portions pressed by a punching machine or the like for adjusting the distance between given portions 49 and 50 of the guide walls 13a and 13b, which will be described in detail hereinafter.

A cam member 19 is put between the tooth member 3 and the base plate 1 and rotatably disposed about the center shaft 2. The cam member 19 comprises a pushing arm 20 which is contactable with a lower wall of the tooth piece 11 and a drawing pawl 21 which is engageable with the lateral projection 15 of the tooth piece 11.

As will become apparent as the description proceeds, when the cam member 19 is pivoted in a counterclockwise direction in FIG. 1, the pushing arm 20 is brought into abutment with the lower wall of the tooth piece 11 thereby to press the tooth piece 11 against the teeth 7 of the tooth plate 3. With this, the teeth 10 of the tooth piece 11 are tightly engaged with the teeth 7 of the tooth plate 3 to achieve a locked engagement therebetween. While, when the cam member 19 is pivoted in a clockwise direction, the drawing pawl 21 pulls down the lateral projection 15 of the tooth piece 11 thereby to move the tooth piece 11 downward along the guide groove 12. With this, the locked engagement between the tooth piece 11 and the teeth 7 of the tooth plate 3 becomes cancelled.

The center shaft 2 comprises a right end portion 2a which has a non-circular cross section, a larger diameter bearing portion 2b which rotatably carries thereon both an after-mentioned control lever 23 and the cam member 19, a smaller diameter bearing portion 2c which rotatably carries thereon the tooth plate 3, and a left end portion 2d which has an axially extending slit 2e. A flange 22 is provided between the right end s portion 2a and the larger diameter bearing portion 2b.

The right end portion 2a of the center shaft 2 is tightly fitted in a non-circular opening 1c formed in the base plate 1. Caulking technique may be used to secure the center shaft 2 to the base plate 1. The flange 22 severs as a stopper for suppressing excessive insertion of the center shaft 2 into the opening 1c. The larger diameter bearing portion 2b is received in both an opening 23a formed in the control lever 23 and an opening 19a formed in the cam member 19, so that the control lever 23 and the cam member 19 can pivot about the axis of the center shaft 2. The smaller diameter bearing portion 2c is received in an opening. 3a formed in the tooth plate 3, so that also the tooth plate 3 can pivot about the axis of the center shaft 2. The left end portion 2d of the center shaft 2 projected from the opening 3a catches an inner end 27a of a return spring 27 by the slit 2e. An outer end 27b of the return spring 27 is hooked to a pin 28 fixed to the tooth plate 3. Due to work of the return spring 27, the tooth plate 3 and thus the seatback 104 (see FIG. 2) are constantly biased to pivot forward, that is, in a counterclockwise direction in FIG. 1 about the axis of the center shaft 2.

The control lever 23 has a grip 35 and has near the opening 23a a small projection 33 which is fitted in an opening 34 formed in the cam member 19. Thus, the control lever 23 and the cam member 19 pivot about the center shaft 2 like a single unit. The control lever 23 further has another projection 23b to which one end 36a of a spring 36 is hooked. The other end 36b of the spring 36 is hooked to a pin 37 fixed to the base plate 1. With this, the control lever 23 and thus the cam member 19 are constantly biased to pivot in a counterclockwise direction about the center shaft 2, that is, in such a direction as to cause the pushing arm 20 of the cam member 19 to push the tooth piece 11 against the teeth 7 of the tooth plate 3.

Figure 4:
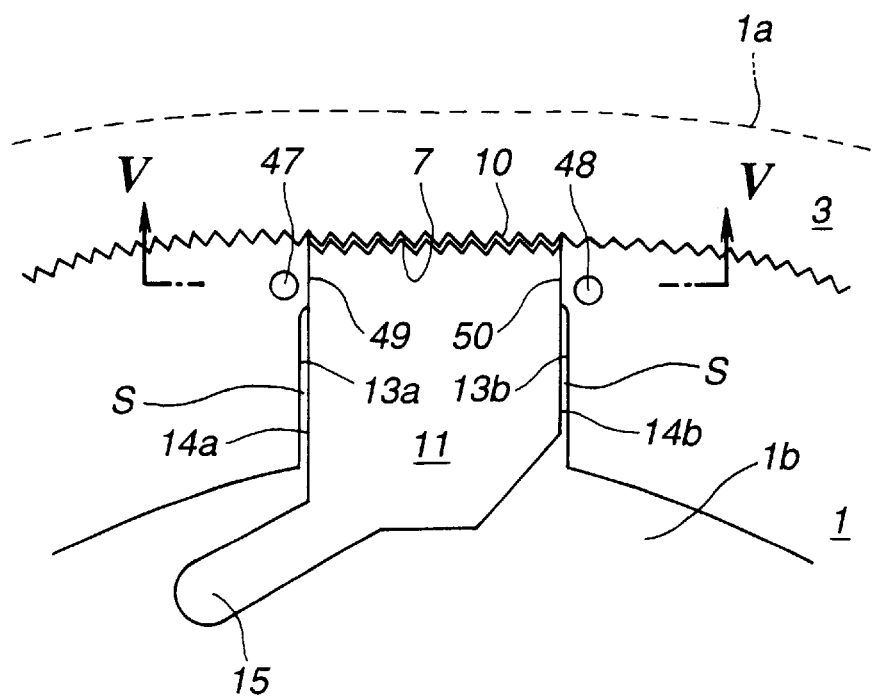
FIG. 4 is a schematic illustration showing a tooth member guiding arrangement employed in the present invention.
Figure 5:
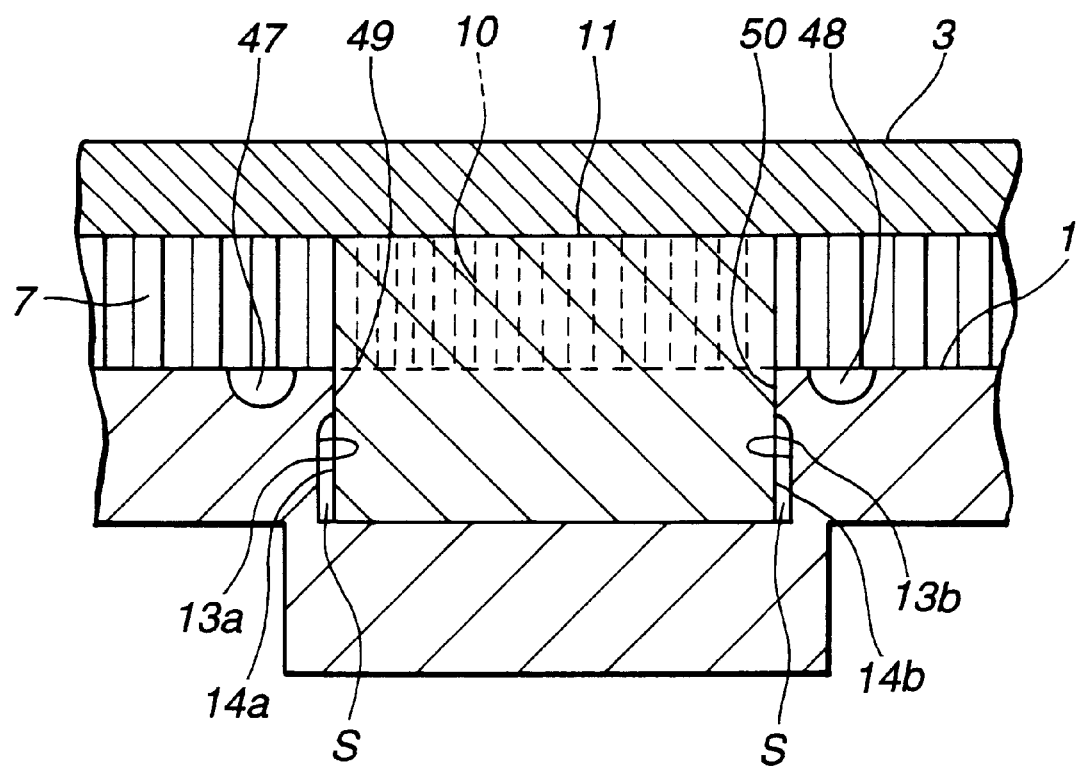
FIG. 5 is a schematically illustrated sectional view of the tooth member guiding arrangement of FIG. 4, which is taken along the line V—V of FIG. 4.

In the following, a tooth member guiding arrangement, that is, the arrangement for guiding the tooth piece 11 in and along the guide groove 12 of the base plate 1 will be described in detail with reference to FIGS. 4 and 5.

These drawings show a condition wherein the tooth piece 11 is received in the guide groove 12 having the teeth 10 thereof kept meshed with the teeth 7 of the tooth plate 3. As is seen from these drawings, particularly FIG. 4, the guide walls 13a and 13b are provided, at portions near the teeth 10 of the tooth plate 3, with respective projections 49 and 50 which are directed toward each other.

The projections 49 and 50 are provided by pressing given portions 47 and 48 of the base plate 1 by using a punching machine or the like. More specifically, the punching to the given portions 47 and 48 is carried out with the tooth piece 11 being kept engaged with the teeth 7 of the tooth plate 3. If desired, in place of the tooth piece 11 actually used, an imitation member (or tool) having the same size and structure as the tooth piece 11 may be used at the time when the given portions 47 and 48 are being punched.

By the punching, two guiding zones are positively provided at each side of the guide groove 12, one being a tight-zone where the side wall 14a or 14b of the tooth piece 11 intimately contacts the guide wall 13a or 13b of the guide groove 12, and the other being a gentle-zone where the side wall 14a or 14b of the tooth piece 11 is separated from the guide wall 13a or 13b of the guide groove 12 by a degree "S".

Due to provision of the projections 49 and 50, the locked engagement between the teeth 10 of the tooth piece 11 and the teeth 7 of the tooth plate 3 is assuredly kept without producing a play therebetween even when a remarkable load is applied thereto. This desirable phenomenon becomes much enhanced as the projections 49 and 50 near the teeth 7 of the tooth plate 3.

If desired, in place of the two projections 49 and 50, one projection may be provided on either one of guide walls 13a and 13b. Furthermore, if desired, two or more projections may be provided on each guide wall 13a or 13b.

Figure 6:
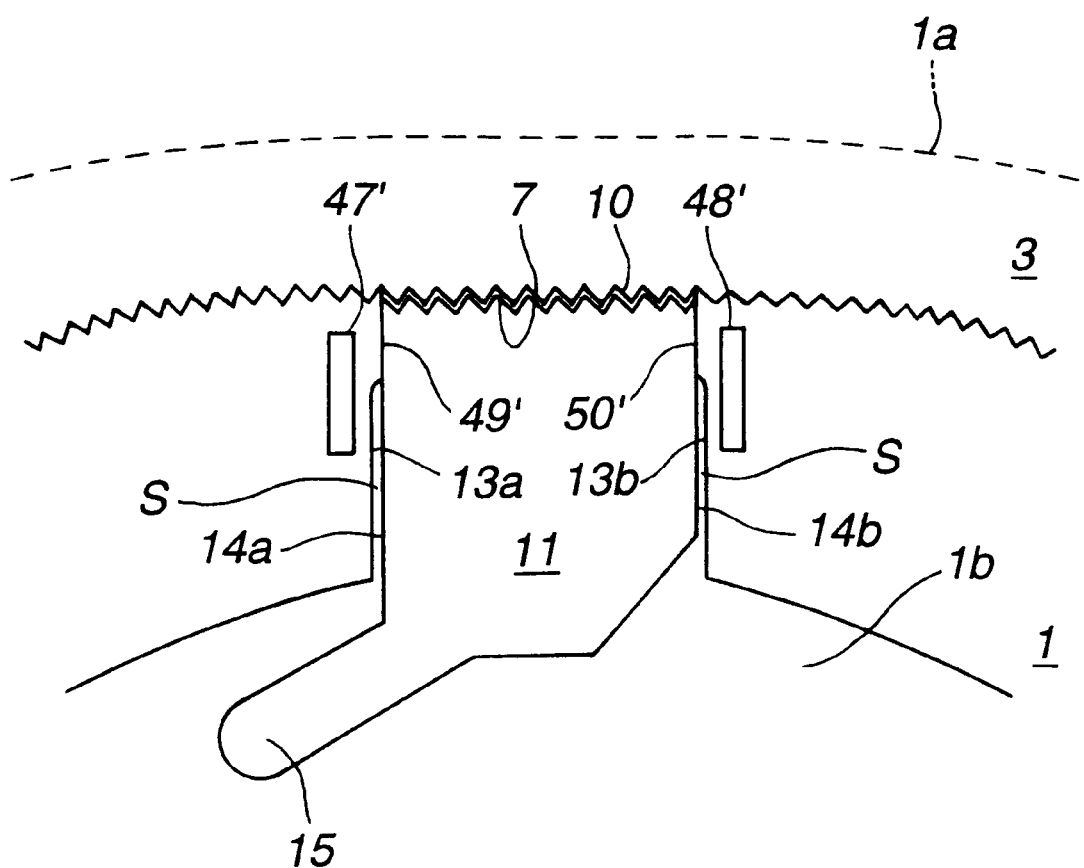
FIG. 6 is a view similar to FIG. 4, but showing a modification of the tooth member guiding arrangement.

FIG. 6 shows a modification of the tooth member guiding arrangement which assures not only the above-mentioned advantage but also a smoothed movement of the tooth piece 11 in the guide groove 12. That is, in this modification, elongate areas 47' and 48' of the base plate 1 are pressed or punched to provide the guide walls 13a and 13b with longer projections 49' and 50'. Due to increase of the contacting area between the tooth member 11 and each of the guide wall 13a or 13b, the movement of the tooth member 11 in the guide groove 12 is stably and smoothly made. Furthermore, the mechanical strength of the projections 49' and 50' is increased. It is to be noted that each groove provided as a result of punching the elongate area 47' or 48' may have a V-shaped cross section or a semicircular cross section. That is, the shape of the groove varies depending on the shape of the work head of the punching tool.

In the following, operation of the seat reclining device 100 will be described with reference to FIGS. 1 and 2.

For ease of understanding, the description will be commenced with respect to a normal in-use condition of the seat wherein the seatback 104 assumes a certain locked angular position relative to the seat cushion 102 for holding a passenger on the seat.

Under this in-use condition, the seat reclining device 100 assumes a locked condition. That is, due to the work of the spring 36, the pushing arm 20 of the cam member 19 keeps pushing the tooth piece 11 against the teeth 7 of the tooth plate 3, and thus, the tooth plate 3 is kept locked to the base plate 1. That is, the seatback 104 is locked to the seat cushion 102 while assuming the certain angular position. Furthermore, due to the work of the spring 36, the control lever 23 assumes its lower position, that is, a rest position.

As has been mentioned hereinabove, under this in-use condition, due to provision of the projections 49 and 50, the locked engagement between the tooth piece 11 and the tooth plate 3 is assuredly kept without producing a play therebetween even when a remarkable load is applied thereto. Thus, the seat occupant is protected from suffering undesired slight back pivoting of the seatback 104 even when he or she leans against the seatback 104.

When now, by the seat occupant, the control lever 23 is pulled upward against the force of the spring 36, the pushing arm 20 of the cam member 19 is disengaged from the tooth piece 11 while bringing the drawing pawl 21 of the cam member 19 into engagement with the lateral projection 15 of the tooth piece 11. When the upward pivoting of the control lever 23 is still continued, the drawing pawl 21 pulls down the tooth piece 11 through the lateral projection 15 thereby canceling the locked engagement between the tooth piece 11 and the tooth plate 3. During this, the tooth piece 11 is slid downward in the guide groove 12. Now, an unlocked condition is established by the seat reclining device 100.

Upon taking this unlocked condition, the seatback 104 is automatically pivoted forward due to the force of the return spring 27. The seatback 104 is then manually pivoted backward against the force of the return spring 27. When the seatback 104 is brought to a new desired angular position, the control lever 23 is released. Upon this, due to the force of the spring 36, the drawing pawl 21 of the cam member 19 is disengaged from the lateral projection 15 of the tooth piece 11 while bringing the pushing arm 20 of the cam member 19 into abutment with the lower wall of the tooth piece 11. With this, the tooth piece 11 becomes engaged with the teeth 7 of the tooth plate 3 at a new angular position, permitting the seatback 104 to be locked at the new desired angular position. During this, the tooth piece 11 is slid upward in the guide groove 12.

Figure 3:
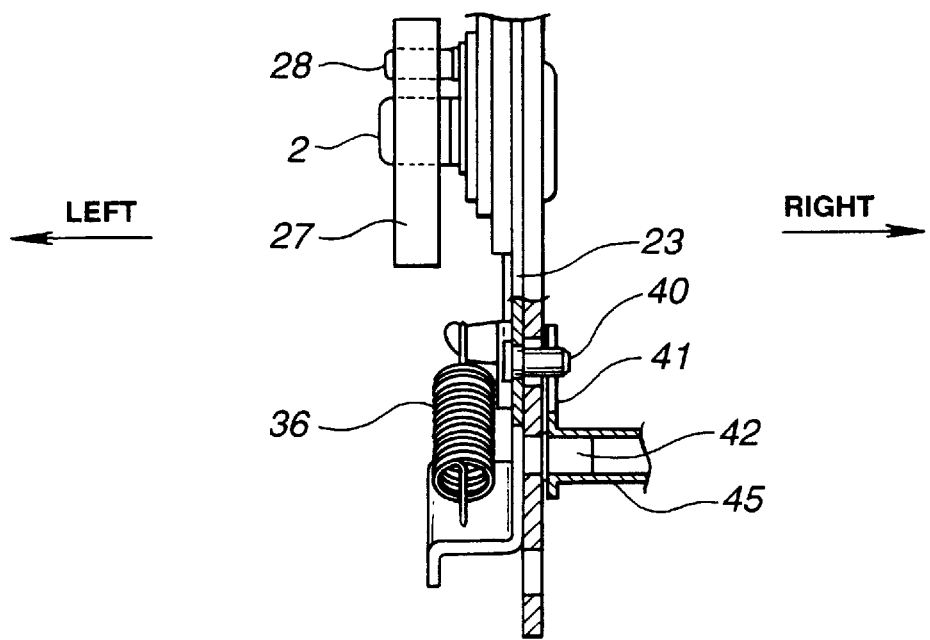
FIG. 3 is a partially sectioned side view of the seat reclining device of the second embodiment.

Referring to FIGS. 2 and 3, there is shown a seat reclining device 200 which is a second embodiment of the present invention.

Since the second embodiment 200 is similar to the above-mentioned first embodiment 100, detailed explanation will be directed to only portions and parts which are different from those of the first embodiment 100.

In the second embodiment 200, flanged pins 38a and 38b are used in place of the pins 8a, 8b, 80 and the sliding shoe 9 which are employed in the first embodiment 100. That is, the pins 38a and 38b extending from the tooth plate 3 have each a circular flange 38a' or 38b' which is slidably mated with the round upper edge 1a of the base plate 1. With such flanged pins 38a and 38b, undesired separation of the tooth plate 3 from the base plate 1 is prevented and thus stable pivoting of the tooth plate 3 relative to the base plate 1 is assured. Denoted by numeral 44 in FIG. 2 is a lug formed on the base plate 1 to hold one end of the spring 36.

Furthermore, in the second embodiment 200, a mechanism for transmitting movement of the control lever 23 to a corresponding part of the right-side pivot mechanism (not shown) is employed. That is, as is seen from FIG. 2, the control lever 23 is formed with an arm portion 39 to which an actuating pin 40 is fixed. The actuating pin 40 extends toward the other side in FIG. 2 through an arcuate slot 43 formed in the base plate 1. The arcuate slot 43 is concentric with the center shaft 2. A generally V-shaped lever 41 is pivotally connected through a pivot pin 42 to a back surface of the base plate 1. The lever 41 and the pivot pin 42 are secured to each other to move like a single unit. The lever 41 puts the actuating pin 40 between the forks thereof, as shown. As is seen from FIG. 3, a tubular transmission shaft 45 is coaxially secured to the pivot pin 42, which extends to the right-side pivot mechanism (not shown).

When, in operation, the control lever 23 is pulled upward by a certain degree, the locked engagement between the tooth piece 11 and the tooth plate 3 is cancelled, as has been described hereinabove. During this, the following action further takes place in the second embodiment 100.

That is, due to the upward movement of the control lever 23, the actuating pin 40 fixed to the control lever 23 is brought into abutment with one of the forks of the V-shaped lever 41 to pivot the lever 41 about an axis of the pivot pin 42 in a so-called disengaging direction, that is, in a counterclockwise direction in FIG. 2. Due to the integral connection between the V-shaped lever 41, the pivot pin 42 and the transmission shaft 45, the pivoting of the lever 41 is transmitted through the transmission shaft 45 to a corresponding part of the right-side pivot mechanism for establishing an unlocked condition of the same. Thus, in the second embodiment 200, the locked and unlocked conditions of the left-side and right-side pivot mechanisms are synchronously carried out.

As has been described hereinabove, in accordance with the present invention, there are provided projections 49 and 50 on the guide walls 13a and 13b of the guide groove 12. With these projections 49 and 50, the locked condition between the tooth piece 11 and the tooth plate 3 is stably held without producing a play therebetween even when a certain load is applied thereto. Thus, the undesired slight back pivoting of the seatback, which would occur in a conventional seat when the seat occupant leans against the seatback, is suppressed according to the present invention.

When the projections 49' and 50' are shaped elongate as shown in FIG. 6, much smoothed movement of the tooth piece 11 in the guide groove 12 is achieved, which enhances the reliable operation of the seat relining device.

The entire contents of Japanese Patent Application P10-110266 (filed Apr. 21, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A seat reclining device comprising:
   a base plate adapted to be secured to a seat cushion;
   a tooth plate adapted to be secured to a seatback, said tooth plate having first teeth;
   a center shaft by which said tooth plate is pivotally supported on said base plate;
   a tooth piece having second teeth which are engageable with said first teeth to bring about a locked condition between said base plate and said tooth plate, said tooth piece having parallel side walls; and
   a guide groove defined by said base plate for slidably receiving therein said tooth piece, said guide groove having parallel guide walls which face and contact the parallel side walls of said tooth piece respectively,
   wherein at least one of said parallel guide walls is provided with a projection which projects toward another of the parallel side walls.

2. A seat reclining device as claimed in claim 1, in which the projection of said parallel guide walls is positioned in the vicinity of said first teeth of said tooth plate.

3. A seat reclining device as claimed in claim 2, in which said projection is provided by pressing a given portion of said base plate.

4. A seat reclining device as claimed in claim 3, in which said projection has a certain length in a direction parallel with the path of said tooth piece, said certain length being so determined as to provide the tooth piece with a smoothed movement in the guide groove.

5. A seat reclining device as claimed in claim 1, in which both of said parallel guide walls are provided with respective projections which are directed toward each other.

6. A seat reclining device as claimed in claim 1, in which said first and second teeth are each formed on a round portion which is concentric with an axis of said center shaft.

7. A seat reclining device as claimed in claim 6, in which said first teeth are formed on an arcuate wall possessed by a recess formed in said tooth plate.

8. A seat reclining device comprising:
   a base place adapted to be secured to a seat cushion;
   a tooth plate adapted to be secured to a seatback, said tooth plate having first teeth;
   a center shaft by which said tooth plate is pivotally supported on said base plate;
   a tooth piece having second teeth which are engageable with said first teeth to establish a locked condition between said base plate and said tooth plate, said tooth piece having parallel side walls;
   a guide groove defined by said base plate for slidably receiving therein said tooth piece, said guide groove having parallel walls which face and contact the parallel side walls of said tooth piece respectively;
   a cam member pivotally supported by said center shaft, said cam member moving said tooth piece in a direction to establish the engagement between the first and second teeth when pivoted in a first direction and moving said tooth piece in a direction to cancel the engagement between the first and second teeth when pivoted in a second direction; and
   a control lever pivotally supported by said center shaft and rotated together with said cam member,
   wherein said parallel guide walls of said base plate are provided near the first teeth with respective projections which project toward each other.

9. A seat reclining device as claimed in claim 8, in which said projections are provided by pressing given portions of said base plate.

10. A seat reclining device as claimed in claim 8, further comprising a movement transmitting mechanism which includes:
    an actuating pin fixed to said control lever to move therewith;
    a lever pivotally connected to said base plate through a pivot pin, said lever having a portion engageable with said actuating pin, said lever and said pivot pin being secured to each other to pivot like a single unit; and
    a transmitting shaft coaxially secured to said pivot shaft to pivot therewith, said transmitting shaft extending to another seat reclining device.

11. A seat reclining device as claimed in claim 8, further comprising:
    first biasing means for biasing said tooth plate to pivot in a given direction relative to said base plate; and
    second biasing means for biasing said cam member to pivot in said first direction.

12. A seat reclining device as claimed in claim 11, further comprising a coupling enhancing means which prevents separation of said tooth plate from said base plate.

13. A seat reclining device as claimed in claim 12, in which said coupling enhancing means comprises a sliding holder secured to said tooth plate, said sliding holder having an arcuate track which, when the tooth plate is pivoted relative to said base plate, slides on and along a round edge of said base plate.

14. A seat reclining device as claimed in claim 12, in which said coupling enhancing means comprises flanged pins, each of said flanged pins extending from said tooth plate and having a circular flange which, when the tooth plate is pivoted relative to said base plate, slides on and along a round edge of said base plate.

\* \* \* \* \*